United States Patent [19]

Okamura et al.

[11] Patent Number: 4,769,730
[45] Date of Patent: Sep. 6, 1988

[54] MAGNETIC TAPE CASSETTE WITH AN IMPROVED GUARD PANEL

[75] Inventors: Masatoshi Okamura, Saku; Haruo Shiba, Komoro, both of Japan

[73] Assignee: TDK Corporation, Tokyo, Japan

[21] Appl. No.: 781,677

[22] Filed: Sep. 30, 1985

[30] Foreign Application Priority Data

Oct. 12, 1984 [JP] Japan .......................... 59-153035[U]

[51] Int. Cl.$^4$ ............................................. G11B 23/02
[52] U.S. Cl. .................................................... 360/132
[58] Field of Search ................ 360/132; 242/197, 198, 242/199

[56] References Cited

U.S. PATENT DOCUMENTS

| | | |
|---|---|---|
| 3,712,559 | 1/1973 | Schwartz . |
| 4,011,358 | 3/1977 | Roelofs . |
| 4,047,232 | 9/1977 | Hisagen et al. ............... 360/134 |
| 4,285,020 | 8/1981 | Sato ................................ 360/132 |
| 4,345,284 | 8/1982 | Saito ............................... 360/132 |
| 4,376,519 | 3/1983 | Ishida et al. ................... 242/197 |
| 4,504,028 | 3/1985 | Goto ............................... 360/132 |
| 4,570,197 | 2/1986 | Hakanson et al. ............. 360/132 |
| 4,625,252 | 11/1986 | Balz et al. ...................... 360/132 |

*Primary Examiner*—Robert S. Tupper
*Assistant Examiner*—Melissa J. Koval
*Attorney, Agent, or Firm*—Wood, Dalton, Phillips, Mason & Rowe

[57] ABSTRACT

In a magnetic tape cassette of the type having a guard panel disposed at the front opening of the cassette housing to cover the opening when the cassette is in storage and expose it when in use, an electrically conductive tape, consisting of a metal foil supported by a base of plastic film, is affixed with adhesive or by ultrasonic welding or other technique to the inner surface of the guard panel. The metal foil may be located on either side of the base of the conductive tape to face the magnetic tape or the guard panel.

4 Claims, 1 Drawing Sheet

MAGNETIC TAPE CASSETTE WITH AN IMPROVED GUARD PANEL

BACKGROUND OF THE INVENTION

This invention relates to a magnetic tape cassette, and more specifically to a magnetic tape cassette with an improved guard panel at the opening of the cassette housing.

Video tape cassettes are designed so that a portion of the magnetic tape is always drawn across the front opening of the cassette housing. A guard panel is openably provided there to protect the tape while the cassette is not in use. The panel is normally biased by spring means to the closing direction so that it always covers the opening when the cassette is not used.

Cassettes of this structure have had problems in common. When they are subjected to vibration or impact from the outside while in storage or in transportation, static electricity is generated by friction between the guard panel and the magnetic tape portion inside, or the panel is electrostatically charged by friction with some external object. In either case the charge draws dust onto the magnetic tape surface, with the possibility of subsequent dropouts, or attracts the tape to the inner surface of the guard panel.

As a countermeasure it has been proposed to form the guard panel and the opposite wall of the cassette housing from a plastic material mixed with an electrically conductive powder. The method has, however, had drawbacks of deformation during molding and some sacrifice of thermal resistance and mechanical strength.

It is an object of the present invention to provide a magnetic tape cassette of the type having a guard panel to expose or cover the front opening of the cassette housing, wherein the magnetic tape and the inner surface of the guard panel are protected from being electrostatically charged.

Another object of the invention is to prevent the electrostatic charging without the need of introducing an electrically conductive powder into the parts such as guard panel according to the prior practice which could cause deformation and reduced thermal resistance and mechanical strength of the magnetic tape cassette.

Yet another object of the invention is to achieve an antistatic effect by simple means at low cost.

SUMMARY OF THE INVENTION

The present invention provides a magnetic tape cassette of the type including a guard panel disposed at the front opening of the cassette housing to cover the opening when the cassette is in storage and expose the same when in use, characterized in that an electrically conductive tape consisting of a metal foil supported by a base of plastic film is affixed with adhesive or by ultrasonic welding or other technique to the inner surface of the guard panel. The metal foil may be located on either side of the base of the electrically conductive tape to face the magnetic tape or the guard panel.

The structure according to the invention solves the problems of the prior art above pointed out. The material for forming the cassette housing or guard panel need not contain any electrically conductive powder. The cassette thus can make the most of the outstanding characteristics of the plastic material and maintain good thermal resistance and other properties. The invention involves a very simplified fabrication process since the electrically conductive tape is simply bonded or ultrasonically welded to the inner surface of the guard panel. In addition, the use of a metal foil produces a remarkable antistatic effect.

DESCRIPTION OF THE PREFERRED EMBODIMENTS

Figure 1:
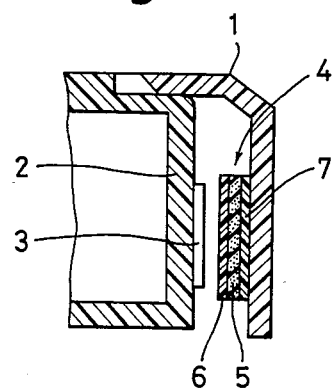
FIG. 1 is a fragmentary sectional view of essential parts of a magnetic tape cassette embodying the present invention.
Figure 4:
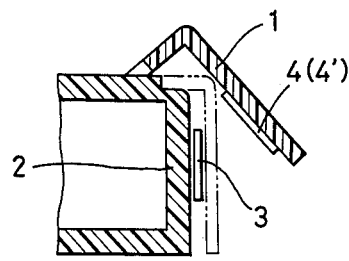
FIG. 4 is a view similar to FIG. 3 but explanatory of the magnetic tape cassette of the invention.

Referring to the drawing, specifically to FIG. 1, there is shown the construction of a guard panel in the first embodiment of the invention. Numeral 1 designates a guard panel as a plastic molding which is pivoted at the both ends of the front opening of the magnetic tape cassette housing to expose and cover the opening. (Refer to FIG. 4.) Magnetic tape 3 partly extends between the front wall of the cassette housing and the guard panel 1 while the cassette is stored or not in use. A length of electrically conductive tape 4 for antistatic use according to the invention is affixed or attached to the inner surface portion of the guard panel 1 facing the magnetic tape. The electrically conductive tape 4 consists of a metal foil 5 such as aluminum foil supported by a plastic film base 6 such as polyester film. The metal foil is deposited on or otherwise secured to the base 6 by metalizing or other technique. The conductive tape 4 produces an adequate antistatic effect when it has a surface electric resistance of from $10^{11}$ to $10^{13}$ $\Omega.cm$ as measured on the base side. It is affixed to the inner surface of the guard panel 1 by an adhesive layer 7 on the metal foil side. Although the illustrated embodiment exposes the base 6 opposite to the magnetic tape, the presence of the metal foil 5 reduces the surface resistance of the base side to a value low enough to achieve a satisfactory antistatic effect.

Figure 2:
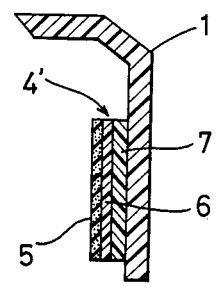
FIG. 2 is a fragmentary sectional view of essential parts of another embodiment of the magnetic tape cassette of the invention.

FIG. 2 shows the construction of a guard panel in another embodiment of the magnetic tape cassette of the invention. Like the counterpart of the first embodiment, the electrically conductive tape 4' in this embodiment consists of a metal foil 5 supported by a base 6. However, it differs from the former in that it is affixed on the base side to the inner surface of the guard panel, with the adhesive layer 7 between. If a suitable thermoplastic material is chosen instead as the base, the electrically conductive tape can be directly attached to the guard panel without using an adhesive but by ultrasonic welding.

Figure 3:
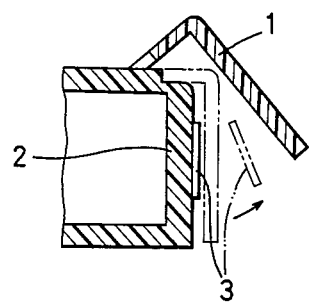
FIG. 3 is a fragmentary sectional view explanatory of essential parts of a conventional magnetic tape cassette.

With the construction described above, the guard panel of the invention has an adequate antistatic effect to settle the problems of dust deposition on the magnetic tape and tape attraction to the guard panel. This will be explained in more detail below. It is often the case with a conventional magnetic tape cassette as shown in FIG. 3 that, as the guard panel is swung open, the magnetic tape 3 is attracted toward the panel and drawn outwardly (as indicated by chain lines). This can result in malfunction of the cassette or dust attraction to the tape and hence dropouts. According to the present invention, as in FIG. 4, the magnetic tape 3 remains stationary in the proper position regardless of whether the guard panel 1 is swung open or not.

As has been described hereinbefore, the present invention attains an excellent antistatic effect on a magnetic tape cassette by simply affixing or welding a strip of an electrically conductive tape to the inner surface of the guard panel. It thus involves a simplified assembling process. Moreover, there is no possibility of the cassette having such reduced thermal resistance as with the conventional guard panel and cassette housing made of a material mixed with an electrically conductive powder.

What is claimed is:

1. A magnetic tape cassette including a housing in which a magnetic tape is encased and having a front opening, a guard panel movably mounted on the housing for movement between a first position and a second position at said front opening of the housing where said magnetic tape exposed by said front opening of the housing is covered by said guard panel in said first position and said cassette is in storage and where said magnetic tape is exposed by said guard panel in said second position and said cassette is in use, said guard panel having a length of electrically conductive tape adhered thereto to reduce the electrostatic charge on said guard panel and magnetic tape, said conductive tape being composed of a plastic film base and a metal foil coextensive with said plastic film base, said conductive tape being attached to an inner surface of said guard panel generally coextensive with and facing that part of said magnetic tape which is exposed by said front opening of said housing.

2. A magnetic tape cassette according to claim 1 wherein said electrically conductive tape attached to the said inner surface of said guard panel has a surface electric resistance from $10^{11}$ to $10^{13}$ ohm cm.

3. A magnetic tape cassette according to claim 1 wherein said plastic film base of said conductive tape attached to said inner surface of said guard panel is located directly opposite and facing said exposed magnetic tape.

4. A magnetic tape cassette according to claim 1 wherein said metal foil of said conductive tape attached to said inner surface of said guard panel is located directly opposite and facing said exposed magnetic tape.

* * * * *